(12) United States Patent
Litvak

(10) Patent No.: US 11,704,543 B2
(45) Date of Patent: Jul. 18, 2023

(54) NEURAL NETWORK HARDWARE ACCELERATION WITH STOCHASTIC ADAPTIVE RESOURCE ALLOCATION

(71) Applicant: SAMSUNG ELECTRONICS CO., LTD., Suwon-si (KR)

(72) Inventor: Shai Litvak, Beit Hashmonaee (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 840 days.

(21) Appl. No.: 16/006,497

(22) Filed: Jun. 12, 2018

(65) Prior Publication Data

US 2019/0378001 A1 Dec. 12, 2019

(51) Int. Cl.
*G06N 3/047* (2023.01)
*G06N 3/063* (2023.01)

(52) U.S. Cl.
CPC ............ *G06N 3/063* (2013.01); *G06N 3/047* (2023.01)

(58) Field of Classification Search
CPC .................................................. G06N 3/0472
See application file for complete search history.

(56) References Cited

U.S. PATENT DOCUMENTS

| | | | | |
|---|---|---|---|---|
| 8,832,614 B2* | 9/2014 | Vrudhula | ............ | G06F 30/327 |
| | | | | 716/105 |
| 2016/0110163 A1* | 4/2016 | Rarick | .................. | G06F 7/552 |
| | | | | 708/503 |
| 2017/0148178 A1* | 5/2017 | Oami | ...................... | G06T 7/292 |
| 2018/0032312 A1* | 2/2018 | Hansen | .................. | G06F 7/5443 |
| 2018/0349096 A1* | 12/2018 | Redfern | .................... | G06F 7/36 |
| 2019/0155575 A1* | 5/2019 | Langhammer | ....... | G06N 3/0445 |
| 2019/0205094 A1* | 7/2019 | Diril | ....................... | G06N 3/048 |

OTHER PUBLICATIONS

Lotrič et al. (Applicability of approximate multipliers in hardware neural networks, Nov. 2012, pp. 57-65) (Year: 2012).*
McLaren et al. (Improved Mitchell-Based Logarithmic Multiplier for Low-power DSP Applications, Sep. 2003, pp. 53-56) (Year: 2003).*
Yu et al. (Vector Processing as a Soft-core CPU Accelerator, Feb. 2008, pp. 222-231) (Year: 2008).*

(Continued)

*Primary Examiner* — George Giroux
(74) *Attorney, Agent, or Firm* — F. Chau & Associates, LLC

(57) ABSTRACT

A digital circuit for accelerating computations of an artificial neural network model includes a pairs selection unit that selects different subsets of pairs of input vector values and corresponding weight vector values to be processed simultaneously at each time step; a sorting unit that simultaneously processes a vector of input-weight pairs wherein pair values whose estimated product is small are routed with a high probability to small multipliers, and pair values whose estimated product is greater are routed with a high probability to large multipliers that support larger input and output values; and a core unit that includes a plurality of multiplier units and a plurality of adder units that accumulate output results of the plurality of multiplier units into one or more output values that are stored back into the memory, where the plurality of multiplier units include the small multipliers and the large multipliers.

19 Claims, 9 Drawing Sheets

(56) References Cited

OTHER PUBLICATIONS

Vincent Vanhoucke, et al., "Improving the Speed of Neural Networks on CPUS," pp. 1-8.
Jiuxiang Gu, et al., "Recent Advances in Convolutional Neural Networks," Oct. 19, 2017, pp. 1-38.
David Stutz, Seminar Report, "Understanding Convolultional Neural Networks," Aug. 30, 2014, pp. 1-23
Alex Krizhevsky, et al., "Imagenet Classification With Deep Convolutional Neural Networks," pp. 1-9.
Philipp Gysel, et al., "Hardware-Oriented Approximation of Convolutional Neural Networks," Oct. 20, 2016, pp. 1-8.

* cited by examiner

NEURAL NETWORK HARDWARE ACCELERATION WITH STOCHASTIC ADAPTIVE RESOURCE ALLOCATION

BACKGROUND

1. Technical Field

Embodiments of the present disclosure are directed to methods and corresponding digital circuits that reduce the power and the physical area required by the arithmetic unit of a neural network, by mixing various types of multipliers and adders in one design.

2. Discussion of the Related Art

Neural-Networks (NN) are central computation models in many advanced algorithms and applications, including recognition and segmentation of objects in images, face recognition, speech recognition, optical character and handwriting recognition, depth extraction from stereo images, automatic translation, and more.

NN-s are typically highly computationally intensive. When many activations of a NN are required, such as for on-line, real-time object detection and segmentation in a video stream at 30 or 60 frames per second, the computational load can become very high, e.g. several Tera ($10^{12}$) operations per second. To support such a load, dedicated digital circuits for accelerating NN computation are useful. Intense computation also consumes a significant amount of power, which can be a major factor in some contexts, such as a mobile devices operating on battery power.

Traditionally NN computations have been implemented on standard general purpose digital hardware such as CPUs and GPUs that use digital circuits that process highly accurate (e.g. 32-bits) floating-point values. However it was recently shown that similar, but less demanding computations on values represented with less accurate values, such as 8 or 16-bit fixed-point integer representations, are sufficient for many real-world applications.

A digital hardware accelerator for NN computations typically includes a large array of multiply-and-accumulate (MAC) arithmetic units that operate in parallel to process many pairs of values, typically layer-data values, sometimes referred as 'activation' values, and filter-weight values. These MAC units are major consumers of processing power, and also require significant physical area for VLSI implementation on the target chip. The array of MAC units includes many arithmetic sub units, specifically multiplication units (multipliers) and addition units (adders).

The complexity, area and power consumed by the adders and multipliers are functions of the size of the representation of input and output values to these units. Roughly speaking, for an integer adder, the size and power grows linearly with the size of the representation. For example, the size of an adder that adds two 16-bit integer input values is roughly twice the size of an adder that adds two 8-bit integer input values, and consumes twice the power. For multipliers, the size and power tend to grow quadratically with the size of the input, so a 16-bit multiplier uses roughly 4 times more area and power than an 8-bit multiplier.

A more detailed description and discussion of a VLSI design of an NN accelerator can be found in this inventor's co-pending patent application, "Low-Power Hardware Acceleration Method And System For Convolution Neural Network Computation", application Ser. No. 15/823,091, filed on Nov. 27, 2017 in the United States Patent and Trademark Office, the contents of which are herein incorporated by reference in their entirety.

SUMMARY

A digital hardware circuit that can accelerate a Neural Network computation includes an array of a plurality of arithmetic units that process pairs of input values in parallel. A method and system according to embodiments of the disclosure includes at least two types of multipliers. The first type supports fully accurate multiplication of larger values while requiring a larger area on the chip and using more power. The second type supports accurate computation only of smaller values, and approximations for larger values, while consuming less area and power. A system according to embodiments of the disclosure includes an efficient router unit that obtains many pairs of input values, and routes each pair to a relevant type of multiplier according to a preliminary estimated magnitude of the product. While not always accurate, the routing decision and the corresponding computation tend to be accurate with a high probability, depending on the statistics of the specific NN. However, due to the inherent redundancy and robustness of NNs, the impact of a low rate of inaccuracies during the computation is typically negligible. Overall, this approach allows successful neural network computation while requiring a smaller circuit and consuming less power.

According to embodiments of the disclosure, there is provided a digital circuit for accelerating computations of an artificial neural network model that includes a memory that stores an input vector, a weight vector, and an output value, a pairs selection unit that selects different subsets of pairs of input vector values and corresponding weight vector values from the memory, to be processed simultaneously at each time step, a sorting unit that simultaneously processes a vector of input-weight pairs wherein pair values whose estimated product is small are routed with a high probability to small multipliers, and pair values whose estimated product is greater are routed with a high probability to large multipliers that support larger input and output values, and a core unit that includes a plurality of multiplier units and a plurality of adder units that accumulate output results of the plurality of multiplier units into one or more output values that are stored back into the memory, where the plurality of multiplier units include the small multipliers and the large multipliers.

According to further embodiments of the disclosure, the sorting unit includes a plurality of function units and a plurality of flip units. Each function unit implements a monotone non-decreasing function of an absolute value of a product of the one of the input vector values and a corresponding weight vector value, and each function unit outputs a result. Each flip compares a first result of a first function unit and a second result of a second function unit and outputs the first result and the second result. When the second result is greater than the first result, the first result and second result are respectively output to a first receiving unit and a second receiving unit, and when the second result is less than the first result, the first result and second result are respectively output to the second receiving unit and the first receiving unit.

According to further embodiments of the disclosure, each function unit includes an adder that adds an index of a non-zero most-significant-bit (MSB) of |v|, an absolute value of one of the input vector values and an index of a non-zero MSB of |w|, an absolute value of the corresponding weight vector value.

According to further embodiments of the disclosure, each function unit further includes a conditional zero-unit that sets an output of the adder to zero if either or both of the indices of the MSBs of the absolute value of the input vector and corresponding weight vector are zero.

According to further embodiments of the disclosure, the sorting unit comprises a layer of function units and one or more layers of flip units. Input values to the flip units of a first layer are the results of two function units, and when there are two or more layers of flip units, input values of each flip unit of a successive layer of flip units are output values from different flip-units in a previous layer of flip units.

According to further embodiments of the disclosure, the small multiplier is an N bit multiplier whose inputs are each N bits and whose output is 2N bits, wherein the multiplier calculates an exact product when the product is representable in K bits, K<2N, and the multiplier calculates an approximation to the exact product when a representation of the exact product is more than K bits.

According to further embodiments of the disclosure, N=8 and K=8.

According to further embodiments of the disclosure, the small multiplier takes as input an N-bit input value v, a corresponding N-bit weight value w and includes a multiplier that calculates the exact product v×w when the exact product is representable in K bits, K<2N, and shift and adder units that calculate 1<<(M−1), wherein M=MSB(|v|)+MSB(|w|), where MSB(x) is an index of a most significant non-zero bit in a binary representation of x and << is a left-shift bit-wise binary operation, when the exact product's representation requires more than K bits.

According to further embodiments of the disclosure, the small multiplier takes as input an N-bit input value v, a corresponding N-bit weight value w and includes a multiplier that calculates the exact product v×w when the exact product is representable in K bits, K<2N, and shift and adder units that calculates (1<<(M−3))+(1<<(M−1))−(1<<⌈M/2⌉), wherein M=MSB(|v|)+MSB(|w|), where MSB(x) is an index of a most significant non-zero bit in a binary representation of x and << is a left-shift bit-wise binary operation, when the exact product's representation require more than K bits.

According to further embodiments of the disclosure, the sorting unit calculates a function of each pair of values and then sorts the pair values into a plurality of categories based on results of the calculated function of the pairs, the core unit includes a plurality of categories of multipliers wherein each category of multipliers is associated with a category of pair values, and the sorting unit routes pair values of a given category to an appropriate multiplier for that given category.

According to another embodiment of the disclosure, there is provided a method of processing a layer in an artificial neural network model, including the steps of receiving a plurality of pairs of input vector component values and corresponding weight vector component values and forming a vector of activation-weight pairs of an input vector component value v and a corresponding weight vector component value w, calculating, for each activation-weight pair, a value of a function g(v,w) of v and w, partially sorting the activation-weight pairs vector by repeatedly comparing pairs of function values g(v,w), and conditionally swapping corresponding activation-weight pairs in the vector based on a comparison result, wherein a number of comparisons is less than or equal to a number of all possible activation-weight pair combinations, wherein activation-weight pairs (v,w) with a smaller function value g(v,w) among the function values g(v,w) are moved with high probability to a first side of the vector, while activation-weight pairs (v,w) with a large function value g(v,w) among the function values g(v,w) are moved with high probability to a second side of the vector opposite form the first side; routing the partially sorted activation-weight pairs (v,w) based on the comparison result wherein activation-weight pairs (v,w) from the first side of the vector are routed to small multipliers, and activation-weight pairs (v,w) from the second side of the vector are routed to a large multiplier; processing the activation pairs routed to the multipliers by multiplying the pairs of values and then accumulating the product results of the multiplications to obtain an output vector value for a current layer, wherein those activation-weight pairs whose function value is small are with a high probability multiplied by a small multiplier to yield a small product, and those activation-weight pairs whose function value is large are with a high probability multiplied by a large multiplier to yield a large product According to further embodiments of the disclosure, the function g is a monotone non-decreasing function of |v×w|, an absolute value of v×w, wherein if |v×w$_1$|≥|v$_2$×w$_2$|, then g(v$_1$,w$_1$)≥g(v$_2$,w$_2$).

According to further embodiments of the disclosure, the monotone non-decreasing function is a sum of an index of a most-significant-bit (MSB) of |v|, an absolute value of an input vector value v and the index of the MSB of |w| the corresponding weight vector value w.

According to further embodiments of the disclosure, the method includes setting the monotone non-decreasing function output to zero if the indices of the MSBs of the absolute input vector value |v| or the corresponding weight vector value |w| are zero.

According to further embodiments of the disclosure, sorting the activation-weight pairs vector outputs an exact order of the pairs, based on values of the corresponding g(v,w).

According to further embodiments of the disclosure, multiplying a weight-activation pair whose estimated product is small comprises calculating an exact product when the exact product is representable in K bits, or calculating an approximation to the exact product when the representation of the exact product is more than K bits, wherein K<2N, wherein N is a number of number of bits in an input value and a corresponding weight value.

According to further embodiments of the disclosure, multiplying a weight-activation pair whose estimated product is small includes calculating an exact product x=v×w of an N-bit input value v and a corresponding N-bit weight value w, when the exact product x is representable in K bits, calculating a result of y=1<<(M−1) wherein M=MSB(|v|)+MSB(|w|), wherein MSB(x) is an index of a most significant bit in a binary representation of x and << is a left-shift bit-wise binary operation, when the exact product x in not representable in K bits, determining whether the exact product of v×w is representable in K bits, and outputting the exact product x in N least significant bits of a 2N-bit output result when the exact product is representable in K bits, or outputting the 2N-bit output result y when the exact product's representation requires more than K bits.

According to further embodiments of the disclosure, multiplying a weight-activation pair whose estimated product is small includes calculating an exact product x=v×w of an N-bit input value v and a corresponding N-bit weight value w, when the exact product x is representable in K bits, calculating a result of y=1<<(M−3)+1<<(M−1)−1<<⌈M/2⌉, wherein M=MSB(|v|)+MSB(|w|), wherein MSB(x) is an index of a most significant bit in a binary representation of x and << is a left-shift bit-wise binary operation, when the exact product x in not representable in K bits, determining whether the exact product of v×w is representable in K bits, and outputting the exact product x in N least significant bits of a 2N-bit output result when the exact product is representable in K bits, or outputting the 2N-bit output result y when the exact product's representation requires more than K bits.

According to further embodiments of the disclosure, the method includes repeating the steps of, for a predetermined number of iterations, simultaneously comparing pairs of function values g(v,w) and conditionally swapping corresponding activation-weight pairs in the vector based on a comparison result.

According to further embodiments of the disclosure, comparing pairs of g(v,w) includes partially sorting the pair values into a plurality of categories based on a size of the g(v,w) of each pair, and routing each activation-weight pair based on its category to an appropriate multiplier, wherein the routed activation-weight pairs is multiplied by the appropriate multiplier to yield an exact product or an approximate product based on g(v,w).

DETAILED DESCRIPTION OF EXEMPLARY EMBODIMENTS

Figure 1:
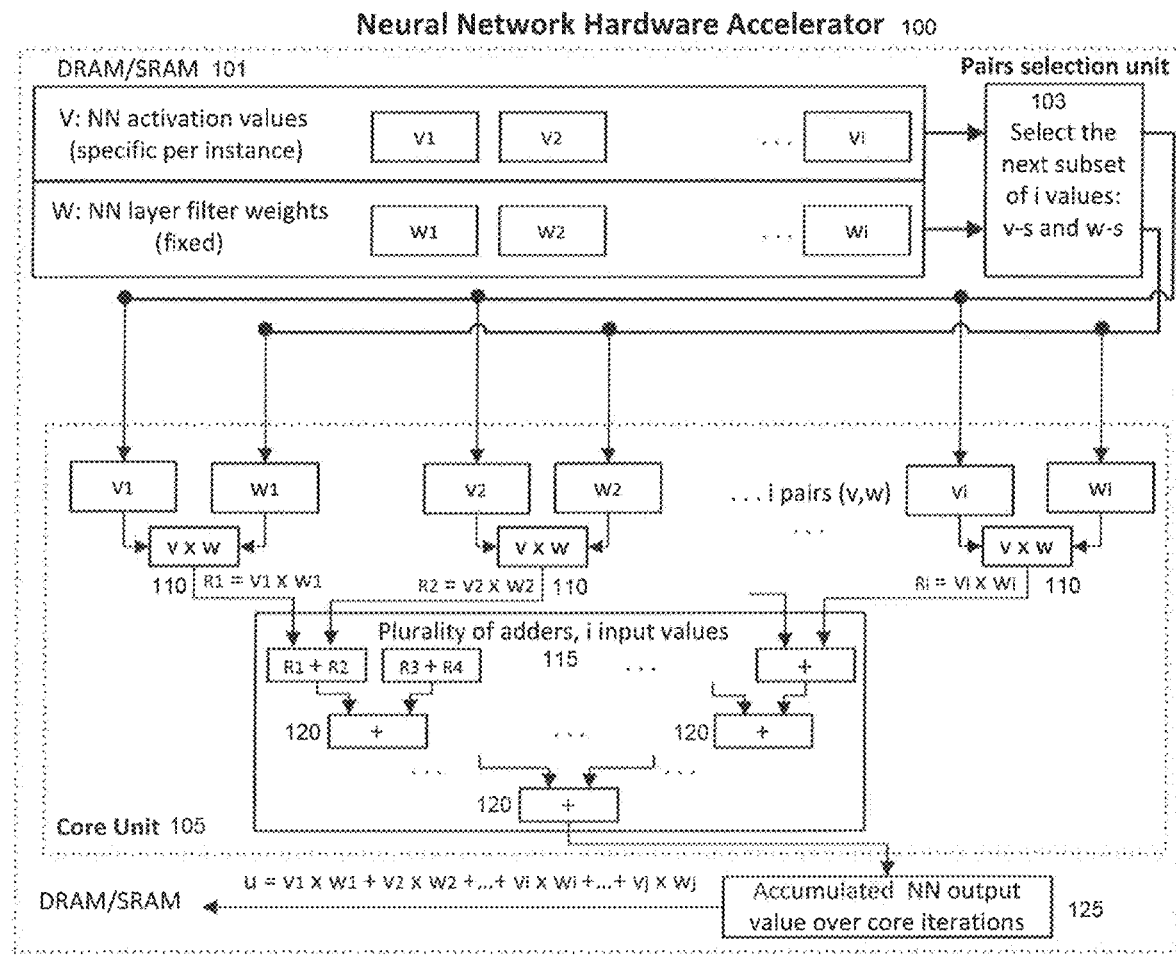
FIG. 1 illustrates a high level design example of a neural network accelerator, according to an embodiment of the disclosure.

Exemplary embodiments of the disclosure as described herein generally provide systems and methods for stochastic adaptive resource allocation in a neural network. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

1. Overview

A neural network (NN) is a method of computation that processes an activation vector $V=v_1, \ldots, v_j$ with j elements by repeated application of layer computations. A NN typically includes many layers and can have various layer topologies, where the output of one layer is an input to another. As an example, a NN can process an input image and output a probability that the image contains a large face.

There are several types of layer computations. The central, highly used, and most resource demanding type of computation implements many multiply-accumulate (MAC) operations of the form:

$$u_k = f(\Sigma_{j=1, \ldots, J} v_j \times w_{k,j}), \qquad (1)$$

The output of the layer is a vector $U=u_1, \ldots, u_k$ with K elements. Each output value $u_k$ is computed by adding J multiplication results of the form $v_j \times w_{k,j}$. The result is then processed by a non-linear function $f$. The entire set of layer parameters, $W_{1 \ldots K, 1 \ldots J}$ is part of the NN definition, and is fixed in the sense that the same parameters are used while processing different instances of activation vectors. For each k; a unique subset of weights $W_k = w_{k,1}, \ldots w_{k,J}$ is used for calculating the instance of output $u_k$ from the activation instance vector V.

Specific types of NNs restrict the computation of EQ. (1) to a limited subset of the indices j. For example in a convolution neural network (CNN), the subset of relevant j's is selected in accordance to the location of $u_k$ in a three dimensional spatial arrangement. The computation of EQ. (1) is repeated during the NN computation with different sets of activations v's and weights w's for each layer of the NN.

A digital very large scale integrated (VLSI) hardware that accelerates the computation of EQ. (1) typically includes many multipliers and adders that operate in parallel to process many corresponding pairs of $v_j$'s and $w_{k,j}$'s. The exact processing order of pairs, how and when they are stored and loaded, are implementation details that may vary between different embodiments and are beyond the scope of the current disclosure.

FIG. 1, below, illustrates an exemplary high level design of a hardware accelerator system 100 that accelerates the computation of EQ. (1) or a similar CNN version of it, for a given NN layer. The v's and w's are loaded from memory 101, such as DRAM or SRAM, depending on the specific implementation. Then, at each processing step, a pair selection unit 103 selects a subset of $v_i$'s and corresponding $w_i$'s from the large set of all $v_j$'s and $w_{k,j}$'s of EQ. (1), and outputs them to be parallel processed in the core unit 105. Each pair of an input vector component $v_i$ and its corresponding weight vector component $w_i$ may be referred to as an activation-weight pair. In the core unit, the computation over the $v_i$'s and $w_i$'s is implemented using the multipliers 110 and the adders 120. The sum of several multiplication results is accumulated in a plurality of adders 115, and stored in register 125, and finally each result $u_k$ is sent to memory 101. According to some embodiment, the plurality of adders can be organized as a tree, but other embodiments are not limited thereto. The vector of all u's is the output of one NN layer. Once they are all computed, the layer output is read from memory and becomes the input (activation) of the computation of the next layer.

For more details on a standard computation of a NN, see, for example David Stutz, Seminar Report—Understanding Convolutional Neural Networks http://davidstutz.de/wordpress/wp-content/uploads/2014/07/seminar.pdf mainly sections 2.1 and 3.1, the contents of which are herein incorporated by reference in their entirety. A standard computation can be implemented by any digital designer of ordinary skill in the art.

For simplicity, in the description below, NN acceleration will sometimes be referred to using integer weights and activations. It has been shown, for example by Gysel, et al., "Hardware-oriented Approximation of Convolutional Neural Networks", ICLR 2016, the contents of which are herein incorporated by reference in their entirety, that it is possible to convert a NN trained with floating-point values to a corresponding similar NN based only on integer values, while losing no or only minor accuracy. However, an NN optimization method according to an embodiment of the disclosure does not depend on the representation of the weights and activation vector.

2. NN Accelerator with Multiple Bit-Width Arithmetic Core Unit

Embodiments of the disclosure provide methods and corresponding system high-level design that can accelerate NN computations in an optimized manner: a multiple bit-width neural accelerator (MBNA). A NN computation is implemented by an MBNA in an approximate manner and the accuracy depends on the statistical properties of the specific NN and the specific processed input. However, in practice, the approximation is found to be sufficiently accurate and does not significantly affect the overall results of the NN computation, such as the correct classification of a main object type in an input image. The size of the digital circuit and the required energy consumption of an MBNA are typically less than the requirements of a standard NN computation. The exact saving depends on the NN, the input and the specific low-level implementation of the MBNA design.

Figure 2:
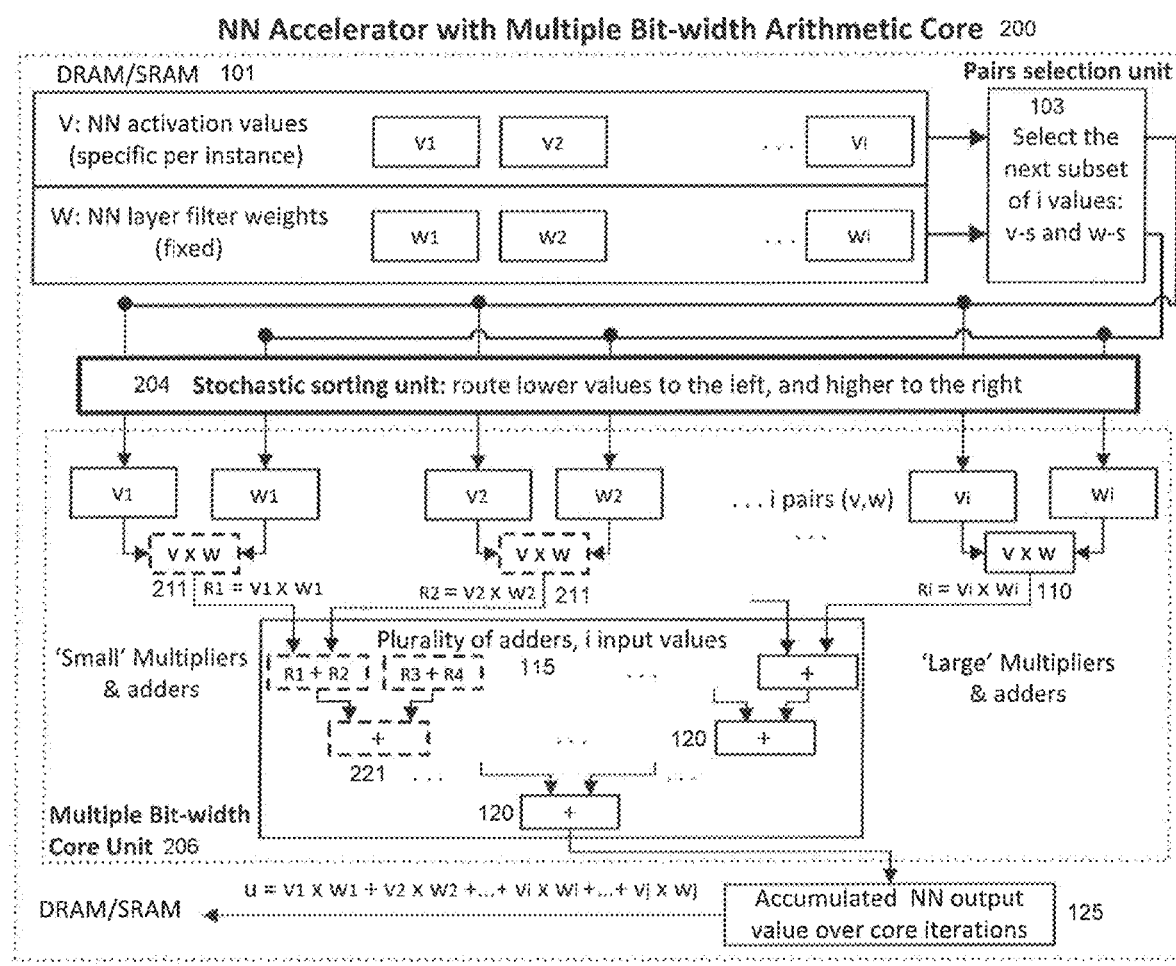
FIG. 2 illustrates a high level design of a multiple bit-width neural accelerator, according to an embodiment of the disclosure.

FIG. 2 illustrates the high level design of a multiple bit-width neural accelerator according to an embodiment of the disclosure. An MBNA, presented in FIG. 2, extends a typical NN accelerator as described above with respect to FIG. 1, with several new processing steps and corresponding system units: a stochastic sorting unit (SSU) and a multiple bit-width core unit (MBC) 206. Since a NN of FIG. 2 includes many of the same components as a NN of FIG. 1, only those components that differ from a NN of FIG. 1 will be descried. A stochastic sorting unit (SSU) 204 routes activation-weight pairs (v's and w's) whose estimated product is small to small multipliers 211 and small adders 221 that require less power and chip area. Other v-w pairs, whose estimated product is greater, are routed to large multipliers 110 that support larger input and output values but require more power and a larger chip area. The outputs of the small multipliers 211 are routed to inputs of the small adders 221 in the plurality of adders 115. Overall, a scheme according to an embodiment can reduce the chip size and power consumed for NN computations, provided that the routing circuit is sufficiently efficient. An SSU can take advantage of input statistics that characterize NN computations, and provide imperfect, yet sufficiently robust reordering of the input. The result is an approximate optimized NN computation that is useful for practical applications.

As disclosed above, the plurality of adders can be organized into a tree in some embodiments. However, in other embodiments, the product results can be accumulated over time and not simultaneously in a tree, i.e., by connecting every multiplier to one corresponding adder. According to an embodiment, the output of the adder is sent to a register, and the value from the register is then sent, at the next time frame, as the second input to the same adder. In this way the adder and register accumulates many product results over time, and once done, the results from all adders and registers comprise the output of the neural-network-layer.

According to embodiments, at each processing step, the SSU 204 receives an input vector of i pairs of activation-weight values $v_i$'s and $w_i$'s, processes them and outputs a vector with the same set of pairs, but with a different order. The processing includes the following steps.

1. For each pair of activation-weight values $v_i$ and $w_i$, calculate a function $M_i=g(v_i, w_i)$ of the magnitude of the product $v_i \times w_i$. The function is a monotone non-decreasing function g of $|v_i \times w_i|$, the absolute value of $v_i \times w_i$ such that if $|v_1 \times w_1| \geq |v_2 \times w_2|$, then $M_1=g(v_1,w_1) \geq M_2=g(v_2,w_2)$. g is any simple function that can be implemented by a small size and low-power circuit. For example, when the v's and w's have integer values represented by the sign-magnitude convention, one can use $M_i=g(v_i,w_i)=MSB(|v_i|)+MSB(|w_i|)$, where $MSB(|x_i|)$ is a 1-based index of the most significant non-zero bit in the binary representation of $|x|$. For clarification of the notation, MSB(5) is 3 since the unsigned 8-bits binary representation of 5 is 00000101, and MSB(0) is 0, since the unsigned 8-bits binary representation of 0 is 00000000 and there is no non-zero bit. For an integer x represented in a sign-magnitude form, the computation of MSB(x) requires only a very simple circuit. For other representations of v's and w's, such as a two's complement integer or floating-point representation, any function g that has a monotone non-decreasing property described above and a small digital circuit implementation can be used. g(v,w) is used as an estimate of the logarithm in base 2 of $|v_i \times w_i|$ that is calculated with a small digital circuit.

2. Based on the estimate g(v,w), route those pairs whose expected products are relatively small, to a left output of the SSU, i.e., to locations with smaller index in the output vector, and pairs with a larger expected product to a right output of the SSU, i.e., to locations with a higher index in the output vector. The pairs in the output vector statistically tend to be ordered according to their $M_i$'s. However the routing procedure does not guaranteed that the output is fully and correctly ordered. More details and examples on the structure and operation of the SSU are described below in the next section.

Figure 5:
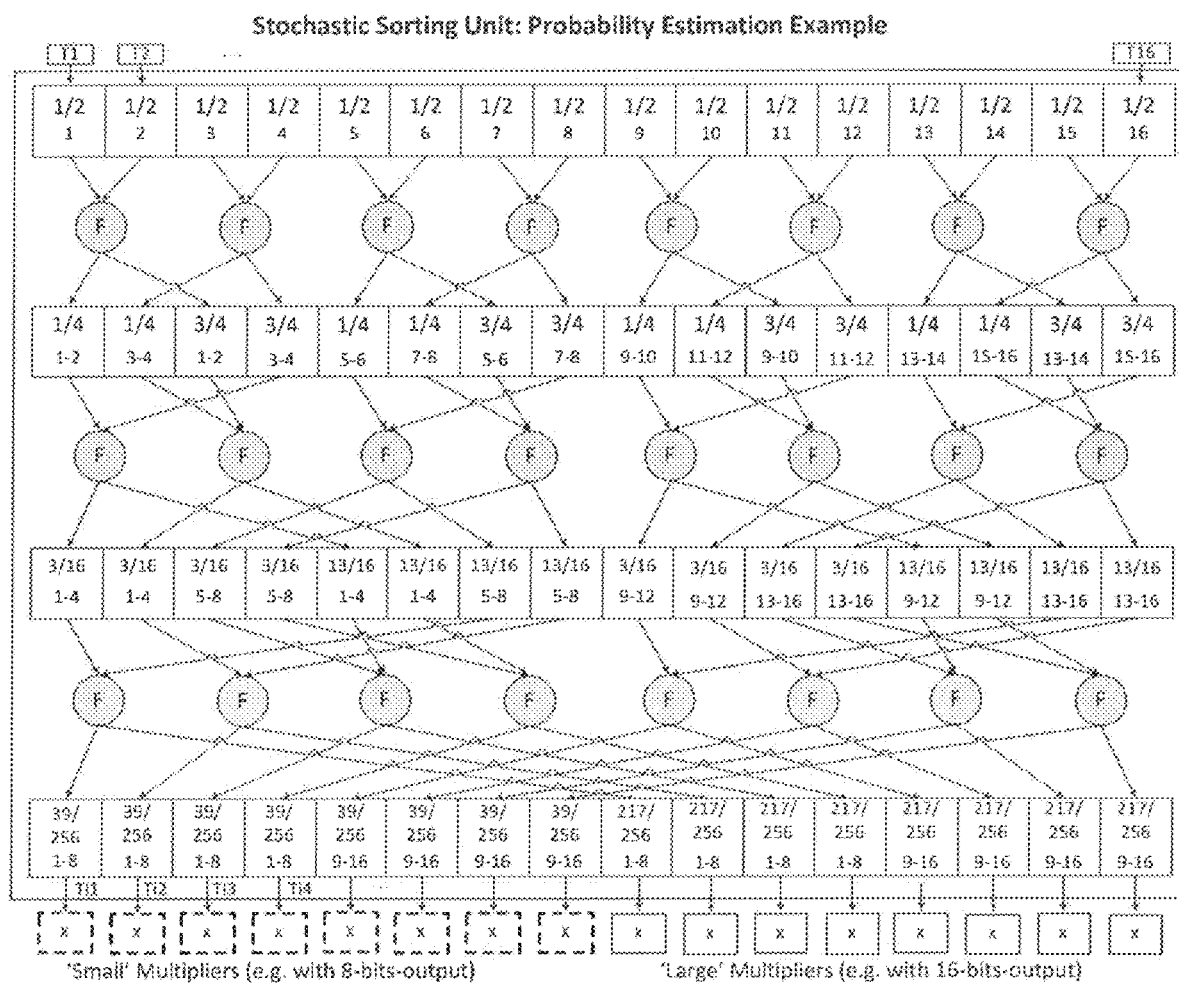
FIG. 5 illustrates the statistical relation between input and output of a stochastic sorting unit, according to an embodiment of the disclosure.

According to an embodiment, the term "partial sorting" refers to a following phenomenon. Notice that when a pair of estimates g(v,w) are compared, the greater result is always routed to one side, and the lesser is always routed to the other side. However since not all possible pair combinations are compared, the overall results after all conditional swaps have been performed is that with high probability 'small pairs' are routed to one side, and 'large pairs' are routed to the other side. The probability of correct routing of small and large pairs after the partial stochastic sorting depends on the probability of small and large pairs before the partial sorting process, as illustrated in FIG. 5, below. In general, a method according to an embodiment raises the probability of correct pair-assignment by the partial sorting method/unit. It is not a 'high' or 'low' probability, but rather a probability that is higher or equal to the probability of having a large pair in the input vector. For example, Consider the extreme case that all pairs at the input of the stochastic-sorting-unit are large. Then, half of the pairs will be routed to the wrong half side after sorting. That is only 50% of the correct location assignment.

A multiple bit-width core unit (MBC) 206 according to an embodiment has an array of multipliers and adders of at least two types: a small type 211 and a large type 210. A small type 211 according to an embodiment is designed to process smaller input values, and requires a smaller digital circuit, which consumes less energy. A large type 210 according to an embodiment can correctly handle larger input values but requires a larger digital circuit and typically consumes more energy.

For example, when the v's and w's are all integer values represented in 8 bits sign-magnitude representation (7 bits magnitude), a small multiplier according to an embodiment is a circuit that can calculate the correct result of the multiplication result v×w when its representation requires only 8 bits, and saturates, i.e., represents the maximal 7-bits magnitude, with the correct sign, otherwise. According to an embodiment, a small multiplier can be referred to as an 8-bits-output multiplier, or simply an 8 bits multiplier. Note that the choice of 8-bits as characterizing a small multiplier is exemplary and non-limiting, and in other embodiments, a small multiplier can handle more bites, such as 16 bits, or fewer bites, such as 4 bits. However, for clarity of exposition, a small multiplier as described below will be an 8-bit multiplier. Other embodiments of small multipliers are described below that do not saturate for large numbers, which can improve the overall accuracy of the MBC.

However, in other embodiments, since most of the savings in area and power is in the multipliers, the adders can be chosen to be all large adders.

A large multiplier according to an embodiment has a 16-bit-output and can correctly and fully compute v×w for any 8-bit integer values v and w. The circuit size of a 16-bit-output multiplier is larger than the 8-bit-output multiplier, and the corresponding energy consumption of the computation is larger.

FIG. 2 depicts an MBC according to an embodiment in which some of the arithmetic sub-units are small, i.e. those on the left, and others are large, i.e. those on the right. The number, or ratio, of large and small sub-units in the arithmetic array is a specific design parameter. If all units are large, the core unit becomes a simple single bit-width core, as in a standard NN accelerator shown in FIG. 1, which exactly implements the NN computation. The larger the number of small units, the less accurate is the approximation to the NN computation, but the MBC circuit size is smaller and consumes less energy. The ratio controls the tradeoff between accuracy and resources. It can be selected based on a specific NN to be accelerated, the accuracy required by a target application and the available energy and accepted circuit size. Moreover, using the same principles, it is also possible to use more than two types of arithmetic units, which can handle a varying magnitude of products and sums with different precision and corresponding power and circuit-size.

A NN according to an embodiment is based on the general scheme depicted in FIG. 1, however, a specific embodiment of the components can vary significantly. Implementation options include, for example, the pair selection order, the representation of v's and w's, the specific selection of small and large multipliers and adders, how the multipliers and adders are connected, the product approximation method, the structure of the sorting unit, etc. Moreover, a somewhat degenerated, yet relevant, variant of an approximate NN computation method does not require sorting at all. It can be based on one type of small multiplier or adder which use a simple estimate of the magnitude of the expected results, such as M, above, and select how to process the input, e.g., by exact computation or an approximations method. Approximation methods are described in more detail below.

3. Partial Sorting with a Stochastic Sorting Unit (SSU)

A sorting unit according to an embodiment combines simplicity and stochastic operations. First, a circuit size and corresponding power consumption should be sufficiently small such that they do not exceed the saving in power consumption and circuit area achieved when using small multipliers and adders in the MBC instead of large ones. This makes an overall MBNA design according to an embodiment more efficient than a standard NN accelerator.

A sorting according to an embodiment can be stochastic in the sense that it receives a vector of activation-weight (v-w) pairs, estimates their expected products, and routes pairs to multiplication units, such that with high probability, pairs with expected products that are relatively small are routed to small multipliers, on the left side in FIG. 2, while pairs whose expected products are higher are routed with high probability to large multipliers, on the right side in FIG. 2. The probabilistic approach is relevant in the context of NN approximate computation since:

Analysis of natural statistics of activation and weights (v-w) values involved with NN computation indicate that among millions or billions of MACs, depending on the specific NN, only a small fraction includes both high activation and high weight values, that produce a high product. This indicates that the savings of using mostly small multipliers can be significant.

Moreover, NN computations are also relatively robust, in the sense that some errors or approximate results among the many MACs involved rarely change the final output of the NN, such as a selected class of a main object that appears in a processed image.

Figure 3:
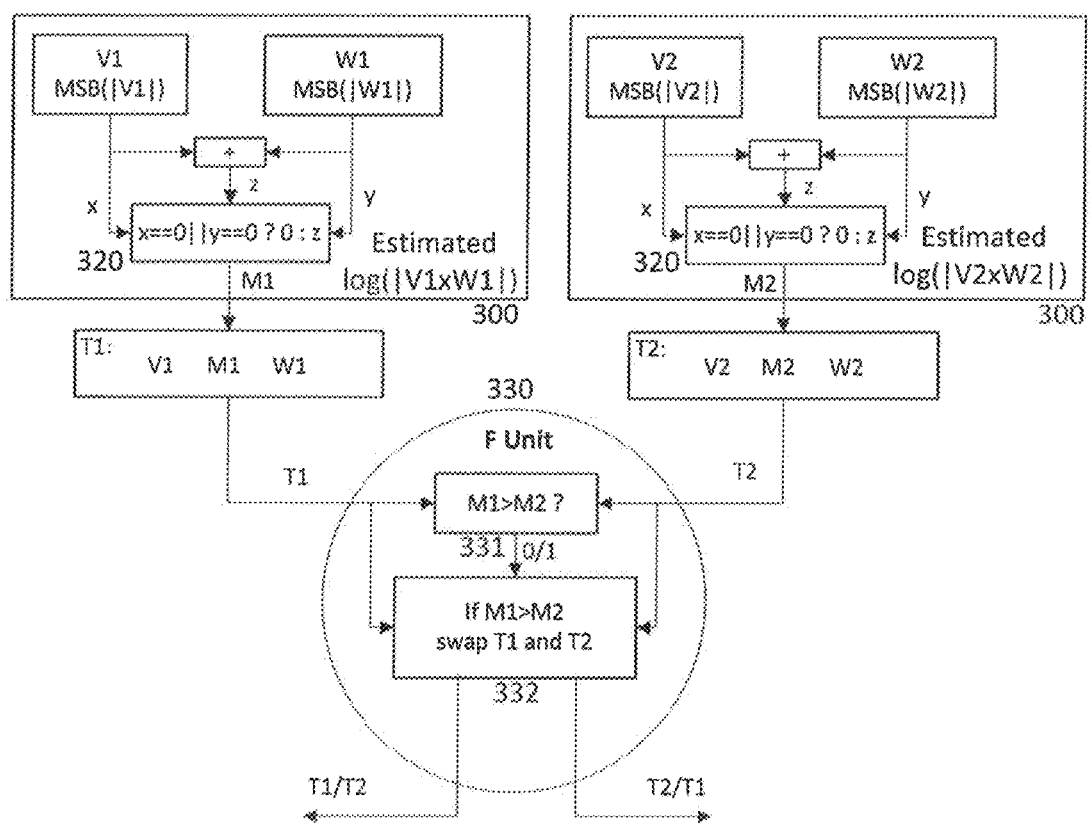
FIG. 3 illustrates a stochastic sorting unit according to an embodiment of the disclosure.

An SSU according to an embodiment of the disclosure is shown in FIG. 3. Referring now to FIG. 3, an SSU includes a plurality of function units 300, and a plurality of flip units 330, labeled as "F Unit" in the figure, so called since the flip unit can flip the inputs. Each functional unit includes an adder 310 and a conditional zero-unit 320 for each activation-weight (v-w) pair. The conditional zero-unit 320 sets the output z of the adder to zero if either or both of the indices of the most significant bits (MSB) of integer |v| and |w| are 0, indicating there are no 1 bits in the representation of |v| or |w|, that is, at least one of the values is 0. M the output of the conditional unit, is the output of the entire functional unit. The function unit 300 is an embodiment of the monotone non-decreasing function g of |v×w|, and outputs an estimate of log(|v×w|). The F unit 330 is a basic building block of a SSU according to an embodiment, and includes a comparator 331 and a swap unit 332. The indices of the most significant non-zero bits (MSB) of integer |v| and |w|, x and y, respectively in the figure, are used to approximate M, a monotone function of the magnitude |v×w|. The triplets $T_1=\{v_1, w_1, M_1\}$ and $T_2=\{v_2, W_2, M_2\}$ are the data blocks being routed after comparing $M_1$ and $M_2$. $M_1$ and $M_2$ are compared in the comparator 331, and when $M_1$ is greater than $M_2$, $T_1$ and $T_2$ are swapped by the swap unit 332. After the swap operation, the T with the smaller M is at the left output, and the other T is at the right output. Note that while FIG. 3 shows a flip unit 330 whose 2 input triplets are the output of 2 function units 300, embodiments are not limited thereto, and in other embodiments, a flip unit 330 can receive input from outputs of 2 other flip units 330, as described below.

Figure 4:
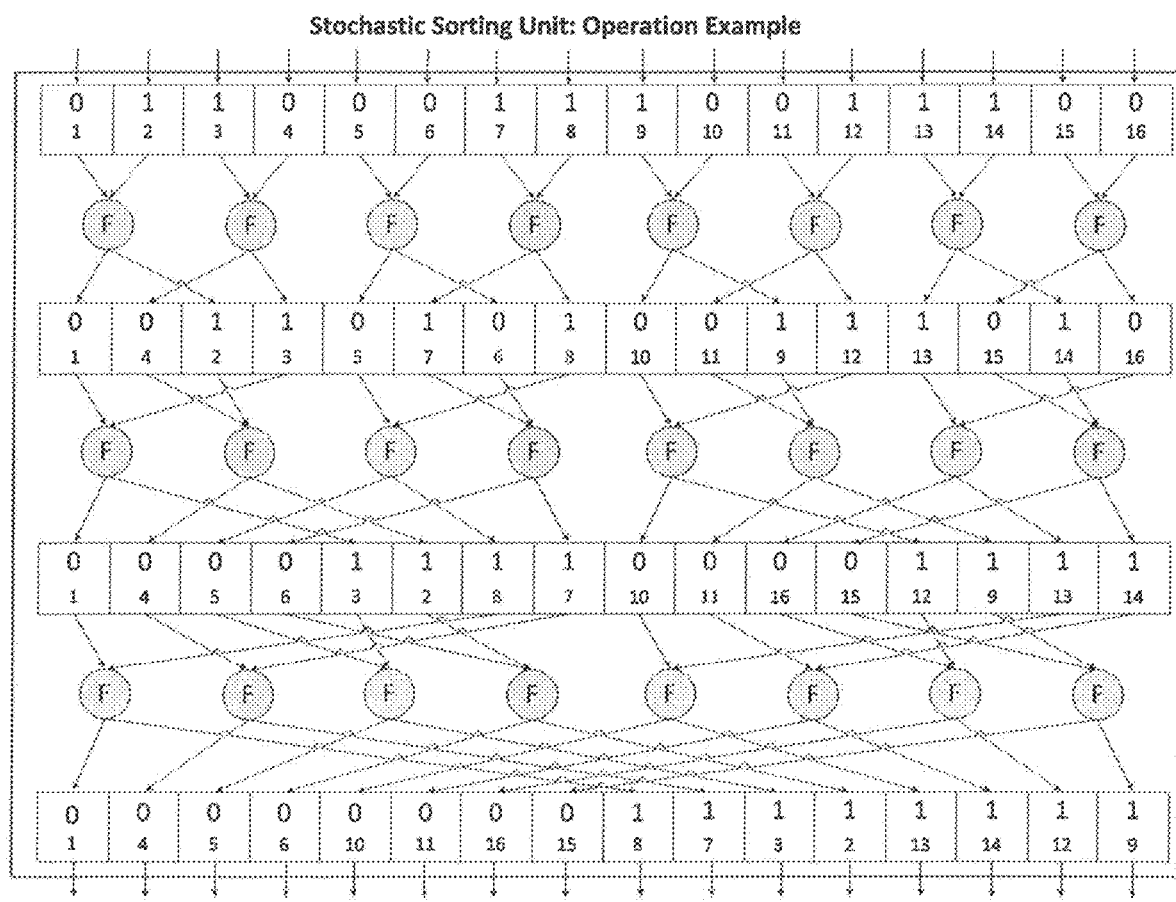
FIG. 4 illustrates the structure of a stochastic sorting unit and a simplified sorting example, according to an embodiment of the disclosure.

According to an embodiment, F units are arranged in layers and connected as shown in FIGS. 4 and 5. FIG. 4 illustrates a stochastic sorting unit structure according to an embodiment and a simplified sorting example. A stochastic sorting unit structure as shown in FIG. 4 includes a single layer of function units 300 and one or more layers of flip units 330, referred to hereinbelow as flip-layers. In a stochastic sorting unit structure according to an embodiment as shown in FIG. 4, the product is estimated only once by the function units, while the estimated value and corresponding original input-weight pair are passed from flip units in one layer to flip units in the next layer. According to an embodiment, the input of each flip unit in a first flip-layer is the output of two function units, while in each successive flip-layer, the two input values of each flip unit are output values from two different flip-units in a previous flip-layer.

Referring now to FIG. 4, a randomly ordered array of 0-s and 1-s in the top row is processed by the SSU. Three flip-layers of flip-units F connected in a specific manner rearrange the vector and gradually tend to send more 0-s to the left and 1-s to the right. The output is the reordered array in the bottom row, which are inputs to the flip-units in the next flip-layer. The smaller number at the bottom of each box indicates the index (1 to 16) of the corresponding 0 or 1 in the input layer. While in this example the output is perfectly sorted, this is not always the case. The boxes represent intermediate values passed on the lines, and are drawn only for clarity. In the digital circuit, the F units are directly connected, and each line carry one T triplet {v, w, M}. All comparisons and routing activity in each layer of 'F' units can occur substantially simultaneously. The layers can be processed as a pipeline, similar to all other components in the NN accelerator, such as the multipliers, adders, etc.

FIG. 5 illustrates an example showing how the statistics of the output depends on that of the input. The fractions at the top of each box represent the probability that the product of the input pair v-w is large, i.e., yields a large M. The number at the bottom of each box shows the range of locations at the input vector that may be routed to the box. Notice that not all routes are optional. In this example, the assumed probability of a large expected product at each input location in the top layer is ½. After the stochastic sorting, at the bottom layer, the probability of a large expected product at the leftmost output line goes down to 39/256, and it is connected to a small multiplier. The probability of a large expected product at the rightmost output line is 217/256, and it is connected a large multiplier These figures illustrate an SSU arrangement according to an embodiment of the disclosure with 16 input pairs {v, w} and corresponding 16 output triplets {v, w, M}, that uses 3 layers with 8 F units in each layer. However, according to other embodiments, a larger or smaller SSU can be used in accordance with the number of multipliers in the MBC, with corresponding n input pairs, n output triplets, $\log_2(n)-1$ processing layers with n/2 F units, depending on the connectivity. The number of layers can also vary: more layers improve the routing and sorting success but also require more energy and area resources.

According to an embodiment, FIG. 4 presents a simplified example, in which only two M values 0 and 1 are processed for clarity of exposition. The other two elements v and w in each triplet T={M, v, w} were omitted from the example as they do not affect the routing.

According to an embodiment, 0 corresponds to any small M, computed for a v-w pair that can be processed exactly by a small multiplier. 1 corresponds to a large M, computed for a v-w pair that requires a large multiplier. In the specific example shown, an input vector with arbitrary 0's and 1's is perfectly sorted at the output. However, different inputs, e.g. when the input has many 1's at the beginning (left side) of the input vector, and 0's at the end, may not yield perfectly sorted results. An SSU according to an embodiment can perform better on cases where the v-w pairs are uncorrelated. To reduce correlations induced by, for example, the spatial arrangement in a convolution neural network, a subtype of neural networks that process images or video streams, the input pairs of the SSU can be assigned in a random or a spatially unrelated manner by a pair selection unit according to an embodiment.

According to another embodiment, 0 can correspond to cases where either or both v or w are 0, such that the product is zero. In many NNs, there is high rate of zero activation. For example, the AlexNet (see http://vision.stanford.edu/teaching/cs231b_spring1415/slides/alexnet_tutgce_kyunghee.pdf) has an average of above 40%, following the application of a rectified linear unit non-linearity. 1's corresponds to all other, non-zero, multiplication results. Zero skipping is a known approach for reducing CNN computations by detecting and avoiding multiplication with zero v or w. In this context, an MBNA with a SSU can be considered a special type of stochastic zero skipping mechanism. To support stochastic zero-skipping, small multipliers according to an embodiment can be simply a naïve generator of 0, or a simple circuit that approximates the product based on M on those cases, which may occur with a small probability, when a non-zero was routed to a small multiplier.

According to embodiment, FIGS. 4 and 5 show, by means of an example, one possible pattern of connection between the F units. In a given layer, each unit is connected to previous layers, such that it compares only values routed from input locations that could not have been already compared in upper layers. To clarify the selection of connectivity, observe the smaller numbers at the bottom of each box in FIG. 5. These numbers indicate the range of indices in the input vector, from which the T's could be routed to the box. For example, note the bottom leftmost box with range 1-8. It is connected to an 'F' unit above it. This unit receives input from two source lines: the left has input range 1-4, and the right has input range 5-8. This means the two M's could not have been compared earlier.

According to an embodiment, FIG. 5 also illustrates how a correct routing of the output depends on the statistics of the input. The fraction at the top of each box represents the probability that the product of the input pair v×w is large, i.e., a large A. This example was described with respect to a simple synthetic case where the probability of a large M at each input location is chosen to be exactly ½. After the stochastic sorting, the probability of a large expected product M at the leftmost output unit goes down to 39/256=0.15, so at a high probability (0.85), the small multiplier connected to this output line, can compute the exact product. The probability of a large expected product at the rightmost output unit is 217/256=0.85, so the output line is connected to a large multiplier. In practice, the probability of pairs whose product is large at the input to the SSU is typically smaller than ½, depending on what is considered 'small'. So an accurate result is computed most of the time.

The output of a sorting-unit/method according to an embodiment is guaranteed to have higher or at least the same rate of correct location assignment of an arbitrary pair, as compared to the input. Practically, in a real NN, the measured probability of having a large pair in the input vector, before sorting, is below 50%, and typically much below 50%. In such cases, as shown above in FIG. 5, the probability of correct assignment of an arbitrary pair, either large and small, to the correct half side of the output vector, is large, that is, above 217/256=85.1%, after sorting with 3 layers. The more sorting layers and comparisons there are, the greater the correct assignment probability of output pairs becomes. For example, after 2 layers it is only 13/16=81.25%. The lower the probability of large pairs in the input vector, the higher the correct assignment probability of output pairs becomes.

Figure 7:
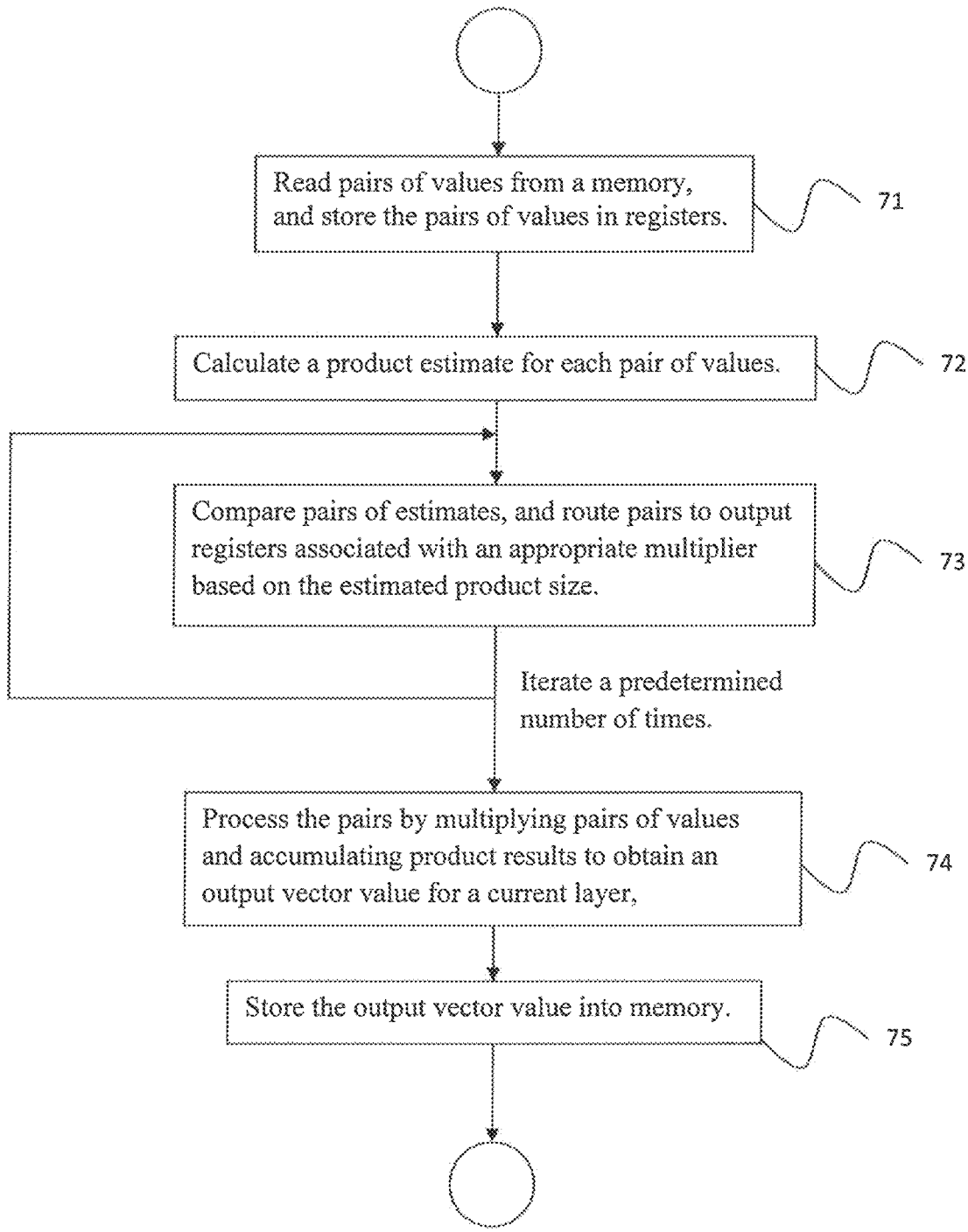
FIG. 7 is a flow chart of a method for stochastic adaptive resource allocation in a neural network, according to an embodiment of the disclosure.

FIG. 7 is a flow chart of a method for stochastic adaptive resource allocation in a neural network, according to an embodiment of the disclosure. Referring now to the figure, a method begins at step 71 by reading a plurality of pairs of input vector component values v and corresponding weight vector component values w from a memory, and storing the pair values in registers. At step 72, estimates M of products v×w are simultaneously calculated for each activation-weight pair of input vector component value v and the corresponding weight vector component value w. At step 73, pairs of estimates are simultaneously compared, and those activation-weight pairs with a smaller estimated product are routed to output registers associated with a small multiplier, and those activation-weight pairs with a large estimated product are routed to output registers associated with a large multiplier. An estimated product is small if it has fewer than a predetermined number N of bits. Step 73 is executed at least once, and can be repeated for a predetermined number of iterations. At step 74, the activation pairs are simultaneously processed in the registers by multiplying the pairs of values and accumulating the product results of the multiplications to obtain an output vector value for a current layer. Those activation-weight pairs whose estimated product is small are multiplied by a small multiplier to yield a small product, and those activation-weight pairs whose estimated product is large are multiplied by a large multiplier to yield a large product. Similarly, small products are accumulated by small adders, and large products are accumulated by large adders. The output vector value is stored back into memory at step 75.

4. Approximate Multiplications

According to embodiment, it can be seen that an SSU may route, although with low probability, a T={v, w, M} triplet with a large expected product v×w to a small multiplier. Section 2 disclosed a simple small multiplier, that is an 8-bit-output multiplier that saturates and outputs the maximal number represented by 8 bits in cases where the expected product exceeds this maximal number. Saturation at 8 bits is however a poor approximation for a general case of two 8-bit operands. According to embodiments, two additional variants of improved approximation method to v×w are described that can be calculated using small circuits and low energy consumption. For simplicity of exposition, a sign-magnitude binary integer representation is used to demonstrate the concept of simple approximation, but embodiments are not limited thereto, and similar variants can be implemented for other integer or floating point number representations. According to an embodiment, the analysis is focused on the magnitude parts, where the sign bit of v×w is simply calculated by XOR(sign(v), sign(w)).

According to an embodiment, consider the specific case of two 8 bit input values v and w, each with 7 magnitude bits. The exact product v×w is represented with at most 16 bits, with 15 magnitude bits. Given that $M=MSB(|v|)+MSB(|w|)$ was already calculated earlier in the SSU, the small multiplier can use the fact that $v \times w < 2^M$ and calculate the following type of approximations to 15 bits magnitude.

According to an embodiment, an approximation that uses a small multiplier is as follows. For highly probable cases, when M<8: calculate the exact values with 7 magnitude bits and embed in the least significant bits of the result. Notice that since M is at most 7, and $v \times w < 2^M$, it is guaranteed that v×w<128, and can be represented using 7 bits magnitude. For other, less probable cases, when M≥8, since $2^{M-2} \leq v \times w < 2^M$, the mean of the upper and lower bound, $v \times w \approx 2^{M-1} = 1 <<(M-1)$, where << is the shift left bit-width operator, can be used: output 1<<(M−1).

Figure 6A:
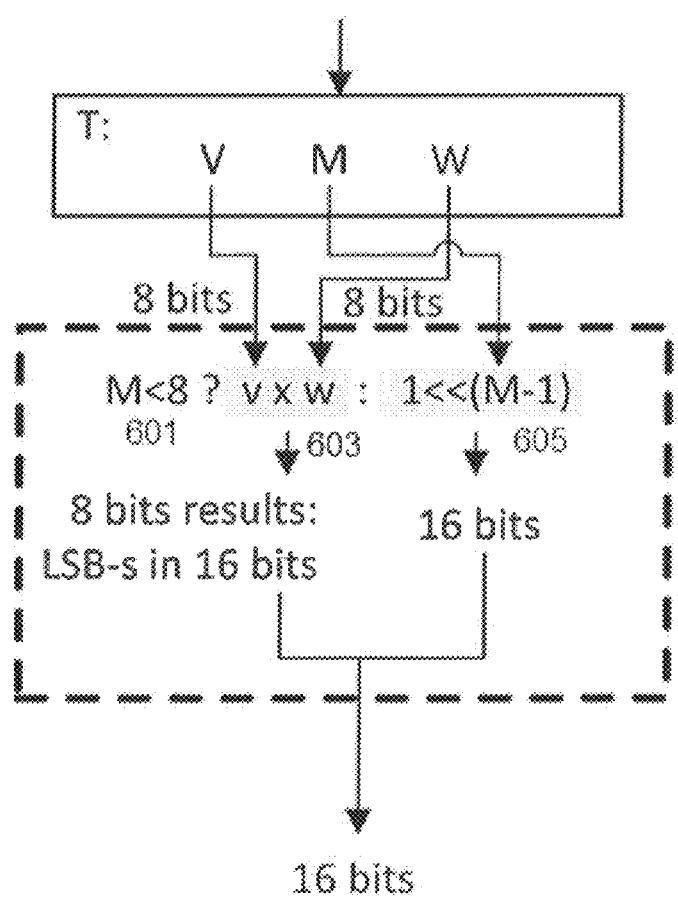
FIG. 6A illustrates a small multiplier with approximated computation of large values, according to an embodiment of the disclosure.

FIG. 6A shows a schematic design of a small multiplier according to an embodiment, with a test unit 601 for testing whether the condition M<8 is true, a multiplier 603 for calculating v×w when the condition is true, and a left shift unit 605 for calculating 1<<(M−1) when the condition is false. The shift left operation used for the cases of M≥8 requires only a simple circuit and consumes little energy, yet the approximation is much better than a 7 bits saturation.

According to an embodiment, another type of approximation that uses a small multiplier is as follows. As with a small multiplier of a previous embodiment, for the highly probable cases, when M<8: calculate the exact values with 7 magnitude bits and embed in the least significant bits of the result. For other, less probable cases, when M≥8: calculate $1<<(M-3)+1<<(M-1)-1<<\lceil M/2 \rceil$. This is because, for a positive integer x:

$$2^{MSB(X)-1} \leq X \leq 2^{MSB(X)} - 1$$
$$2^{MSB(v)+MSB(w)-2} \leq v \times w \leq 2^{MSB(v)+MSB(w)} - 2^{MSB(v)} - 2^{MSB(w)} + 1$$
$$2^{M-2} \leq V \times W \leq 2^M - 2^{MSB(v)} - 2^{MSB(w)} + 1 < 2^M - 2^{\lceil \frac{M}{2} \rceil +1} + 1$$

Taking the mean of the upper and lower bound:

$$V \times W \approx \frac{2^{M-2} + 2^M - 2^{\lceil \frac{M}{2} \rceil +1}}{2} = 2^{M-3} + 2^{M-1} - 2^{\lceil \frac{M}{2} \rceil}$$

This requires a slightly larger circuit for the M≥8 case but the approximation is better.

Figure 6B:
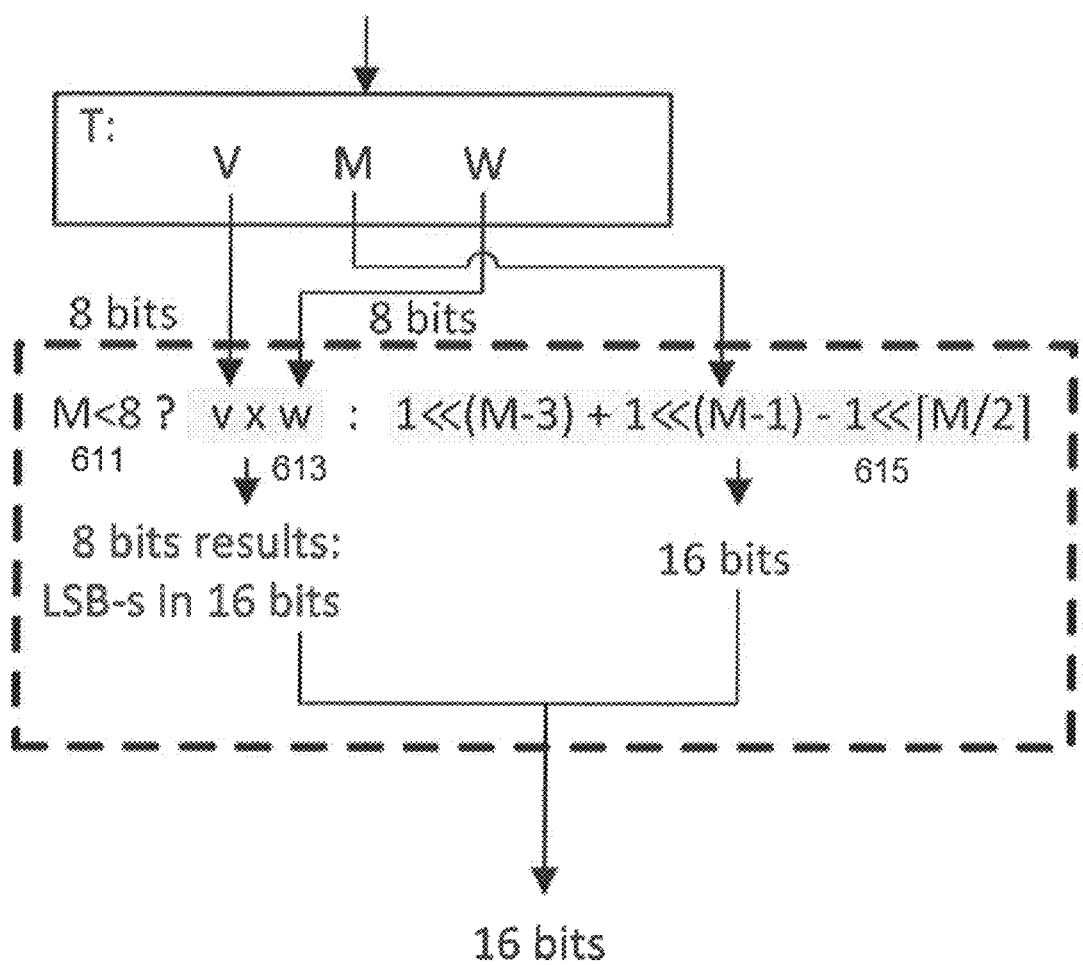
FIG. 6B illustrates another small multiplier with approximated computation of large values, according to an embodiment of the disclosure.

FIG. 6B shows a schematic design of a small multiplier according to another embodiment, with a test unit 611 for testing whether the condition M<8 is true, a multiplier 613 for calculating v×w when the condition is true, and a shift-and-add unit 615 for calculating $1<<(M-3)+1<<(M-1)-1<<\lceil M/2 \rceil$ when the condition is false.

According to an embodiment, a same approximation method can be applied to large bit-width input. For example, if the large multiplier can correctly process two 16-bits input values and generate a 32-bit result, the corresponding small multiplier calculates the exact result for M<16, with 15 magnitude bits, and an approximate value using the same equations above, for the M≥16 cases. However, embodiments are not limited thereto, and other possible approximations exist.

5. Effects

According to embodiments of the disclosure, accelerating a neural network computation using low-power hardware is useful for continuous or massive activation of neural-network based applications on mobile phones, drones, tablets, smart cameras, laptops, virtual and augmented reality devices, and any other device with limited electrical power resources.

Relevant NN-based and CNN-based applications include, among others:

- Image and video processing, such as denoising, demosaicing, deblurring, sharpening, super-resolution (smart upscale), recoloring, disparity/depth extraction from stereo vision, and more.
- Image, video and scene understanding such as: recognition, classification and segmentation of objects, people, faces, vehicles; interpretation of relations between entities in scenes; recognition of facial emotions and expression and eye tracking; human body and hand pose estimation, hand gestures and human action recognition;
- Language related applications such as: handwriting recognition, speech recognition, speech synthesis, machine translation, speech base man-machine interaction and conversation.

For the automotive industry, many applications are based on neural network models, including driver assist and alert applications, automatic lane and distance control, all the way to fully automatic driving, speech and gesture based interaction between the driver and the car system, and more. Video streams from multiple cameras, lidars and other sensors mounted on the car can be analyzed either on a dedicated circuit that is part of each sensor, or on a central computation device that processes and integrates all visual information. Such analysis is based on a neural networks model, and system according to embodiments of the disclosure can be used to reduce overall electrical power consumption in a car.

In addition, low-power, dedicated acceleration of neural network computations may be useful for non-portable home computers, and also when running multiple instances of neural network models on servers. In general, such acceleration is useful for all devices that use neural network models as a primary computation model, in cases where the overall consumed computation power becomes significant in terms of expenses and environmental considerations and in systems where cooling becomes a challenge.

6. System Implementations

It is to be understood that embodiments of the present disclosure can be implemented in various forms of hardware, software, firmware, special purpose processes, or a combination thereof. In one embodiment, the present disclosure can be implemented in hardware as an application-specific integrated circuit (ASIC), or as a field programmable gate array (FPGA). In another embodiment, the present disclosure can be implemented in software as an application program tangible embodied on a computer readable program storage device. The application program can be uploaded to, and executed by, a machine comprising any suitable architecture.

Figure 8:
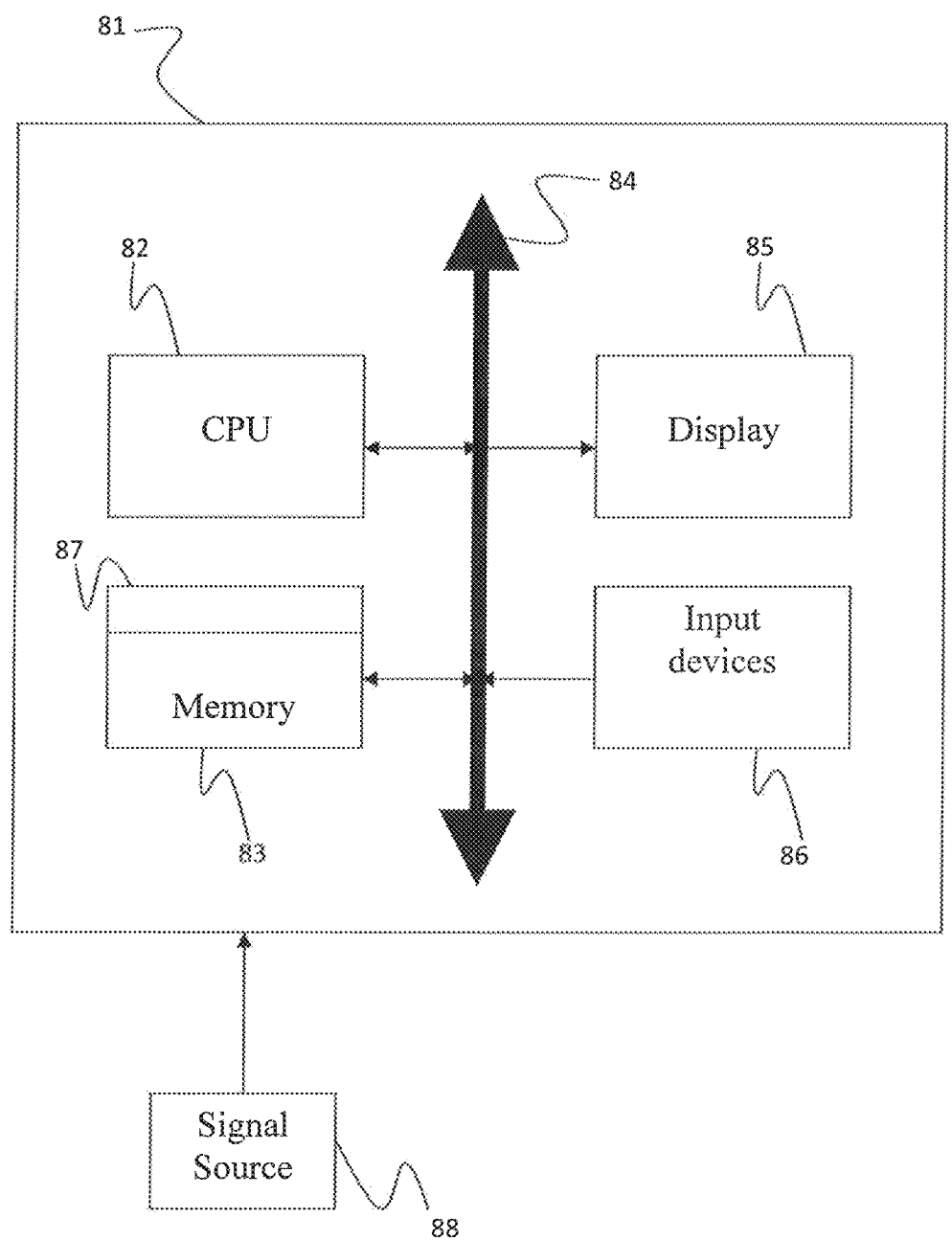
FIG. 8 is a block diagram of a system that implements a method for stochastic adaptive resource allocation in a neural network, according to an embodiment of the disclosure.

FIG. 8 is a block diagram of a system that implements a method for stochastic adaptive resource allocation in a neural network according to an embodiment of the disclosure that consumes low power and maintains the required precision. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present disclosure can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention. Alternatively, as described above, embodiments of the present disclosure can be implemented as an ASIC or FPGA 87 that is in signal communication with the CPU 82 to process the signal from the signal source 88.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A digital circuit for accelerating computations of an artificial neural network model, comprising:
    a memory that stores an input vector, a weight vector, and an output value;
    a pairs selection unit that selects different subsets of pairs of input vector values and corresponding weight vector values from the memory, to be processed simultaneously at each time step;
    a sorting unit that simultaneously processes a vector of input-weight pairs by estimating products of pairs of input vector values and corresponding weight vector values, comparing pairs of estimated products, and for each pair of compared estimated products, routing an input vector value and corresponding weight vector value pair with a larger estimated product to a large multiplier that supports larger input and output values, and routing an input vector value and corresponding weight vector value pair with a smaller estimated product to a small multiplier that supports smaller input and output values wherein a large product is represented by N bits, a small product is represented by N/2 bits, N is a positive integer that is a power of 2, a large multiplier is configured to multiply large products, and a small multiplier is configured to multiply small products; and
    a core unit that includes a plurality of multiplier units and a plurality of adder units that accumulate output results of the plurality of multiplier units into one or more output values that are stored back into the memory, wherein the plurality of multiplier units include the small multipliers and the large multipliers, wherein the sorting unit comprises:

a plurality of function units, wherein each function unit implements a monotone non-decreasing function of an absolute value of a product of one of the input vector values and a corresponding weight vector value, wherein each function unit outputs a result; and a plurality of flip units, wherein each flip compares a first result of a first function unit and a second result of a second function unit and outputs the first result and the second result, wherein when the second result is greater than the first result, the first result and second result are respectively output to a first receiving unit and a second receiving unit, and when the second result is less than the first result, the first result and second result are respectively output to the second receiving unit and the first receiving unit.

2. The digital circuit of claim 1, wherein each function unit includes an adder that adds an index of a non-zero most-significant-bit (MSB) of |v|, an absolute value of one of the input vector values and an index of a non-zero MSB of |w|, an absolute value of the corresponding weight vector value.

3. The digital circuit of claim 2, wherein each function unit further includes a conditional zero-unit that sets an output of the adder to zero if either or both of the indices of the MSBs of the absolute values of the input vector and corresponding weight vector are zero.

4. The digital circuit of claim 1, wherein the sorting unit comprises a layer of function units and one or more layers of flip units, wherein input values to the flip units of a first layer are the results of two function units, and when there are two or more layers of flip units, input values of each flip unit of a successive layer of flip units are output values from different flip-units in a previous layer of flip units.

5. The digital circuit of claim 1, wherein the small multiplier is an N bit multiplier whose inputs are each N bits and whose output is 2N bits, wherein the multiplier calculates an exact product when the product is representable in K bits, K<2N, and the multiplier calculates an approximation to the exact product when a representation of the exact product is more than K bits.

6. The digital circuit of claim 5, wherein N=8 and K=8.

7. The digital circuit of claim 5, wherein the small multiplier takes as input an N-bit input value v, a corresponding N-bit weight value w and includes a multiplier that calculates the exact product v×w when the exact product is representable in K bits, K<2N, and shift and adder units that calculate 1<<(M−1), wherein M=MSB(|v|)+MSB(|w|), wherein MSB(x) is an index of a most significant non-zero bit in a binary representation of x and << is a left-shift bit-wise binary operation, when the exact product's representation requires more than K bits.

8. The digital circuit of claim 5, wherein the small multiplier takes as input an N-bit input value v, a corresponding N-bit weight value w and includes a multiplier that calculates the exact product v×w when the exact product is representable in K bits, K<2N, and shift and adder units that calculate (1<<(M−3))+(1<<(M−1))−(1<<⌈M/2⌉), wherein M=MSB(|v|)+MSB(|w|), wherein MSB(x) is an index of a most significant non-zero bit in a binary representation of x and << is a left-shift bit-wise binary operation, when the exact product's representation require more than K bits.

9. The digital circuit of claim 1, wherein:

the sorting unit calculates a function of each pair of values and then sorts the pair values into a plurality of categories based on results of the calculated function of the pairs, the core unit includes a plurality of categories of multipliers wherein each category of multipliers is associated with a category of pair values, and the sorting unit routes pair values of a given category to an appropriate multiplier for that given category.

10. A method of processing a layer in an artificial neural network model, comprising the steps of:

receiving a plurality of pairs of input vector component values and corresponding weight vector component values and forming a vector of activation-weight pairs of an input vector component value v and a corresponding weight vector component value w;

calculating, for each activation-weight pair, a value of a function g(v,w) of v and w;

partially sorting the activation-weight pairs vector by repeatedly comparing pairs of function values g(v,w), and for each pair of compared function values g(v,w), routing an input vector value and corresponding weight vector value pair with a larger function value u(v,w) to a large multiplier that supports larger input and output values, and routing an input vector value and corresponding weight vector value pair with a smaller function value g(v,w) to a small multiplier that supports smaller input and output values wherein a number of comparisons is less than or equal to a number of all possible activation-weight pair combinations, wherein a large value is represented by N bits, a small value is represented by N/2 bits, and N is a positive integer that is a power of 2;

routing the partially sorted activation-weight pairs (v,w) based on the comparison result for each activation-weight pair wherein activation-weight pairs (v,w) from the first side of the vector are routed to a small multiplier, and activation-weight pairs (v,w) from the second side of the vector are routed to a large multiplier, wherein a large multiplier is configured to multiply large values, and a small multiplier is configured to multiply small values; and processing the activation-weight pairs routed to the multipliers by multiplying values of the activation-weight pairs and then accumulating the product results of the multiplications to obtain an output vector value for a current layer, wherein those activation-weight pairs whose function value is small are with a greater than 50% probability multiplied by the small multiplier to yield a small product, and those activation-weight pairs whose function value is large are with a greater than 50% probability multiplied by the large multiplier to yield a large product.

11. The method of claim 10, wherein the function g is a monotone non-decreasing function of |v×w|, an absolute value of v×w, wherein if $|v_1 \times w_1| \geq |v_2 \times w_2|$ then $g(v_1, w_1) \geq g(v_2, w_2)$.

12. The method of claim 11, wherein the monotone non-decreasing function is a sum of an index of a most-significant-bit (MSB) of |v|, an absolute value of an input vector value v and the index of the MSB of |w| the corresponding weight vector value w.

13. The method of claim 12, further comprising setting the monotone non-decreasing function output to zero if the indices of the MSBs of the absolute input vector value |v| or the corresponding weight vector value |w| are zero.

14. The method of claim 10, wherein sorting the activation-weight pairs vector outputs an exact order of the pairs, based on values of the corresponding g(v,w).

15. The method of claim 10, wherein multiplying a weight-activation pair whose estimated product is small comprises
calculating an exact product when the exact product is representable in K bits, or
calculating an approximation to the exact product when the representation of the exact product is more than K bits, wherein K<2N,
wherein N is a number of number of bits in an input value and a corresponding weight value.

16. The method of claim 15, wherein multiplying a weight-activation pair whose estimated product is small comprises:
calculating an exact product x=v×w of an N-bit input value v and a corresponding N-bit weight value w, when the exact product x is representable in K bits;
calculating a result of y=1<<(M−1) wherein M==MSB(|v|)+MSB(|w|), wherein MSB(x) is an index of a most significant bit in a binary representation of x and << is a left-shift bit-wise binary operation, when the exact product x in not representable in K bits;
determining whether the exact product of v×w is representable in K bits, and
outputting the exact product x in N least significant bits of a 2N-bit output result when the exact product is representable in K bits, or
outputting the 2N-bit output result y when the exact product's representation requires more than K bits.

17. The method of claim 15, wherein multiplying a weight-activation pair whose estimated product is small comprises:
calculating an exact product x=v×w of an N-bit input value v and a corresponding N-bit weight value w, when the exact product x is representable in K bits;
calculating a result of y=1<<(M−3)+1<<(M−1)−1<<⌈M/2⌉, wherein M=MSB(|v|)+MSB(|w|), wherein MSB(x) is an index of a most significant bit in a binary representation of x and << is a left-shift bit-wise binary operation, when the exact product x in not representable in K bits;
determining whether the exact product of v×w is representable in K bits; and
outputting the exact product x in N least significant bits of a 2N-bit output result when the exact product is representable in K bits, or
outputting the 2N-bit output result y when the exact product's representation requires more than K bits.

18. The method of claim 10, further comprising repeating the steps of, for a predetermined number of iterations, simultaneously comparing pairs of function values g(v,w) and conditionally swapping corresponding activation-weight pairs in the vector based on a comparison result.

19. The method of claim 10, wherein comparing pairs of g(v,w) further comprises
partially sorting the pair values into a plurality of categories based on a size of the g(v,w) of each pair, and routing each activation-weight pair based on its category to an appropriate multiplier,
wherein the routed activation-weight pairs is multiplied by the appropriate multiplier to yield an exact product or an approximate product based on g(v,w).

* * * * *